United States Patent [19]
Seretti et al.

[11] Patent Number: 5,978,776
[45] Date of Patent: Nov. 2, 1999

[54] VEHICULAR DATA EXCHANGE SYSTEM AND METHOD THEREFOR

[76] Inventors: Harry Seretti, 115 Euclid Ave., McKees Rocks, Pa. 15136; Carl Schaukowitch, 11700 Bishop's Content Rd., Mitchellville, Md. 20721

[21] Appl. No.: 08/885,175

[22] Filed: Jun. 30, 1997

[51] Int. Cl.$^6$ .................................................. G06F 17/60
[52] U.S. Cl. ................................ 705/26; 705/37; 705/28
[58] Field of Search .............................. 705/3, 4, 28, 26; 395/200

[56] References Cited

U.S. PATENT DOCUMENTS

| | | |
|---|---|---|
| 3,573,747 | 4/1971 | Adams et al. . |
| 3,581,072 | 5/1971 | Nymeyer . |
| 4,789,928 | 12/1988 | Fujisaki .................................... 364/401 |
| 5,136,501 | 8/1992 | Silverman et al. . |
| 5,243,515 | 9/1993 | Lee . |
| 5,521,815 | 5/1996 | Rose, Jr. ................................... 364/409 |
| 5,611,047 | 3/1997 | Wakamiya et al. ................. 395/200.01 |
| 5,640,569 | 6/1997 | Miller et al. . |
| 5,758,328 | 5/1998 | Giovannoli ................................ 705/26 |
| 5,774,873 | 6/1998 | Bernet et al. .............................. 705/26 |
| 5,845,265 | 12/1998 | Woolston ................................... 705/37 |

*Primary Examiner*—James P. Trammell
*Assistant Examiner*—Yehdega Retta

[57] ABSTRACT

The vehicular data exchange system of the present invention includes a plurality of computer terminals and a processor. Each of the computer terminals include an input device for inputting the vehicular data and a display device for visually displaying the inputted vehicular data which include vehicular characteristics data units and vehicular financial data units. The processor controls the vehicular data whereby the vehicular characteristics data units inputted into a first one of the computer terminals are transmitted to a plurality of other ones of the computer terminals for display on respective ones of the display devices associated with the other ones of the computer terminals. The processor also controls the vehicular data whereby vehicular financial data units inputted to at least a responding one of the other ones of the computer terminals in response to the vehicular characteristics data units displayed on the display device of the at least responding one of the other ones of the computer terminals are transmitted to the first one of the computer terminals for display on the display device associated with the first one of the computer terminals. A method of implementing the present invention is also described.

17 Claims, 4 Drawing Sheets

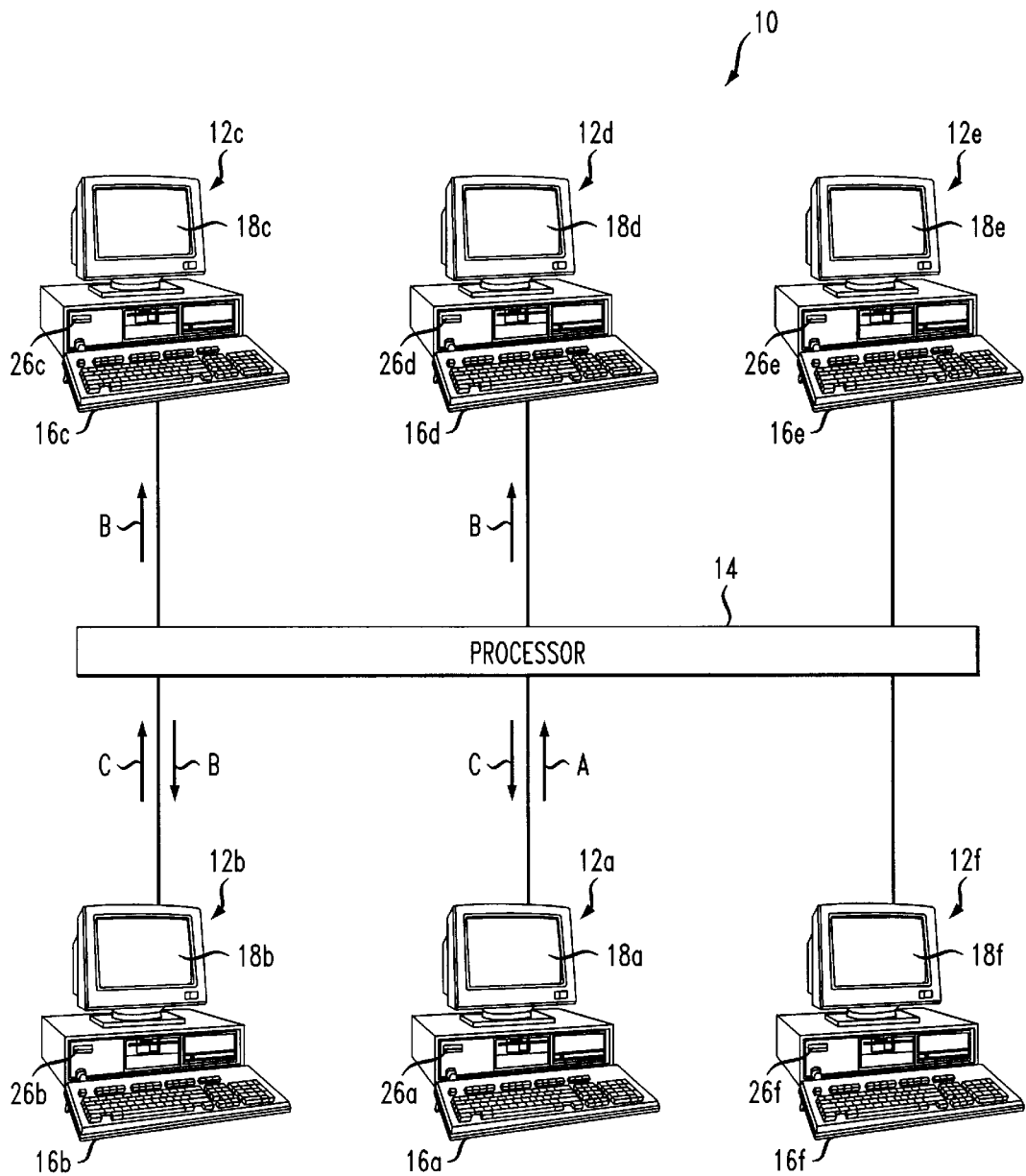

*FIG. 2*

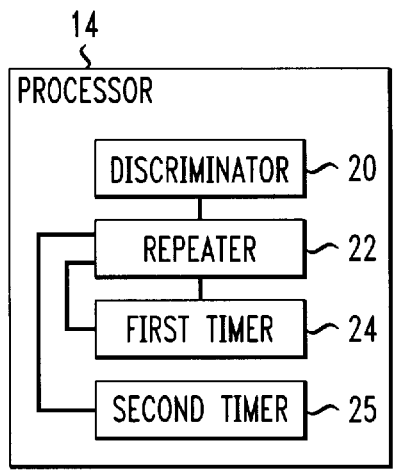

*FIG. 3*

```
                        AUTO AUCTION ON-LINE SYSTEM
ABC Auto Dealership        Customer ID Number: ABCxxxxx Request for Buy/Appraisal Figure for Vehicle Inventory Number:_____Located in Zip Code:_____
Requested by: (Time and Date) and no Later Than: (Time and Date)
Make:_____Model:_____Year:_____
Body Style:_____Color_____ Int._____ Ext._____
Mileage:_____Vin#:_____
Engine:_____ Condition of Glass:_____
General Condition:_____Clean_____Average_____Rough
Condition of Tires:_____ New_____ Greater Than 50%_____Less Than 50%
Other Equipment:_____
Remarks:_____
```

FIG. 4

```
                           AUTO AUCTION ON-LINE SYSTEM
XYZ Auto Dealership        Customer ID Number: XYZxxxxx
Contact:_____          at (999) 999-9999

Request for Buy/Appraisal Figure for

Vehicle Inventory Number:_____Located in Zip Code:_____
Requested by: (Time and Date) and no Later Than: (Time and Date)
Make:_____Model:_____Year:_____
Body Style:_____Color_____ Int._____ Ext.
Mileage:_____ Vin#:_____
Engine:_____ Condition of Glass:_____
General Condition:_____Clean_____Average_____Rough
Condition of Tires:_____New_____Greater Than 50%_____Less Than 50%
Other Equipment:_____
Remarks:_____

Response to Request for Buy/Appraisal Figure
                              for
    Vehicle Inventory Number:_____Located in Zip Code Area:_____

Our Firm Buy Figure is _____

Our Appraisal Figure is _____

Our Firm Buy Figure is Conditional Upon Satisfactory Inspection of the
Vehicle at Our Sole Discretion
```

VEHICULAR DATA EXCHANGE SYSTEM AND METHOD THEREFOR

FIELD OF THE INVENTION

The present invention is related to a vehicular data exchange system. More particularly, the present invention is directed to vehicular data exchange system so that users of the vehicular data exchange system can, within a brief time period, simply and easily exchange vehicle data with one another for the purposes of buying and selling motor vehicles and/or obtaining appraisal data for motor vehicles.

BACKGROUND OF THE INVENTION

In order to better serve a prospective automobile buyer, both new and used selling car dealers often must be willing to accept a trade-in vehicle from the prospective buyer or risk losing that prospective buyer to a competitor. Unfortunately, some trade-in vehicles are a particular make and model that are unfamiliar to the selling car dealer. To provide the prospective buyer with a trade-in value, the selling car dealer must either guess at an appropriate trade-in value of the trade-in vehicle, ascertain a general value of the trade-in vehicle as published in a "blue book" or contact a competitor which is familiar with the value of that type of make, model and year of the vehicle.

Each of these options has drawbacks for the selling car dealer. Guessing at the value of the trade-in vehicle usually results in one of two outcomes. Either too high of a value afforded to the trade-in vehicle results in loss of income to the dealer or too low of a value discourages the prospective customer who might shop for a new vehicle elsewhere. The "blue book" provides only a generalized value of the trade-in vehicle. Also, a subscription to the current "blue book" is expensive and the "blue book" becomes obsolete within a short period of time. Contacting a competitor is time consuming and often frustrating because even if the competitor extends the courtesy of returning a telephone call to provide an appropriate trade-in value figure, it might be hours or even days after the prospective customer has already left the selling dealer's premises. Further, the competitor is typically providing only his best estimate of the trade-in value of the trade-in vehicle and not often is the competitor interested in tendering a buy figure for the purpose of purchasing the trade-in vehicle from the selling dealer.

After the selling dealer sells the customer a new or used car, the trade-in vehicle can either be placed on the used or "pre-owned" car lot of the selling dealer for resale, taken and sold at an automobile auction or sold to an automobile wholesaler. When the trade-in vehicle fails to sell within a set period of time, for example, ninety (90) days, the selling dealer would most likely remove the vehicle from the used car lot and either deliver it to an automobile auction or sell it to a wholesaler to maintain a fresh inventory of used cars. Typically, the wholesaler dictates the purchase price of the trade-in vehicle which the wholesaler is willing to pay. Sometimes this results in a financial loss to the selling dealer.

Occasionally, an unscrupulous used car manager might accept monetary "kickbacks" from a wholesaler for selling car lot vehicles unwanted by the selling dealer to the wholesaler at an exceptionally low price. Such an exceptionally low price results in further financial loss to the selling dealer.

There is a need in the automobile sales industry to provide a vehicle exchange system whereby a selling dealer can rapidly and conveniently sell or obtain sales price information on used or trade-in motor vehicles. It would be beneficial if a prospective customer of the selling dealer remains on the premises while bids or sales price information are being solicited and obtained from other automobile dealers. There is also a need in the automobile sales industry to provide a vehicle data exchange system whereby users to the vehicle data exchange system can rapidly and conveniently provide a firm buy figure to the selling dealer offering the trade-in vehicle of the prospective customer. It would be beneficial to selling dealers to minimize the use of automobile wholesalers in order to obtain the maximum dollar amount for the trade-in vehicle from those users of the vehicular data exchange system.

OBJECTS AND SUMMARY OF THE INVENTION

It is an object of the invention to provide a vehicular data exchange system so that users to the vehicular data exchange system can exchange vehicle data with one another for the purposes of buying and selling motor vehicles and/or obtaining appraisal data information for motor vehicles.

It is another object of the present invention to provide a vehicular data exchange system so that users thereto can quickly and conveniently exchange vehicle characteristics data and vehicle sales price data.

Yet another object of the present invention is to provide a vehicular data exchange system whereby vehicular data can be exchanged within a time period during which a prospective customer of the selling dealer remains on the premises.

A still further object of the present invention is to provide a vehicular data exchange system that could minimize or even eliminate the use of automobile wholesalers.

Yet another object of the present invention is to provide a vehicular data exchange system which would yield firm buy figures from other automotive dealers within minutes from the time the vehicular characteristics data are disseminated from a selling dealer.

A still further object of the present invention is to provide a vehicular data exchange system capable of transmitting vehicular characteristics data units such as make, model and year of the vehicle to only those users interested in receiving such data.

Yet still further, another object of the present invention is to provide a vehicular data exchange system that requires a minimum of time and a minimum of effort for a user to input vehicular data into the system.

Accordingly, a vehicular data exchange system of the present invention which is adapted for use to exchange vehicular data relating to a vehicle is hereinafter described. In its broadest form, the vehicular data exchange system includes a plurality of computer terminals and a processor. Each of the computer terminals includes an input device for inputting the vehicular data and a display device for visually displaying the inputted vehicular data. The vehicular data includes vehicular characteristics data units such as make, model and year of a vehicle and vehicular financial data units such a buy figure or appraisal figure.

The processor controls the vehicular data whereby the vehicular characteristics data units inputted into a first one of the computer terminals are transmitted to a plurality of other ones of the computer terminals for display on respective ones of the display devices associated with the other ones of the computer terminals. The processor also controls the vehicular data whereby vehicular financial data units inputted to at least a responding one of the other ones of the computer terminals in response to the vehicular characteristics data units displayed on the display device of the at least responding one of the other ones of the computer terminals are transmitted to the first one of the computer terminals for display on the display device associated with the first one of the computer terminals.

The present invention also is a method of exchanging vehicular data of a vehicle. The method of the present invention includes inputting vehicular characteristics data units of the vehicle into a data inquiring computer terminal, processing the vehicular characteristics data units by transmitting the vehicular characteristics data units to a plurality of responsive computer terminals for display thereon, inputting vehicular financial data units into at least one of the plurality of data responsive computer terminals in response to the vehicular characteristics data received by the responsive computer terminals and transmitting the vehicular financial data units to the inquiring computer terminal for display on the inquiring computer terminal.

The method of the present invention also includes the processing the vehicular characteristics data units by selecting select ones of the plurality of the data responsive computer terminals to which the vehicular characteristics data units are transmitted. The method also includes repeating transmission of the vehicular characteristics data units to the select ones of the plurality of responding computer terminals until the select ones of the data responding computer terminals receive the vehicular characteristics data units. The method of the present invention includes repeating transmission of the vehicular characteristics data units to the select ones of the plurality of responding computer terminals which occurs upon expiration of a first predetermined period of time and stopping the repeating step upon expiration of a second predetermined period of time which is longer than the first predetermined period of time.

These and other objects of the present invention will become more readily appreciated and understood from consideration of the following detailed description of the exemplary embodiments of the present invention when taken in conjunction with the accompanying drawings, in which:

BRIEF DESCRIPTION OF THE DRAWINGS

FIG. 1 is a schematic diagram of a vehicular data exchange system of the present invention;

FIG. 2 is a schematic diagram of a processor for controlling exchange of vehicular data by employing the vehicular data exchange system of the present invention;

FIG. 3 is a sample display screen shown on a display device of the vehicular data exchange system of the present invention formatted for requesting a buy/appraisal figure for a vehicle with vehicular characteristics data units listed thereon;

FIG. 4 is a sample display screen shown on the display device of the vehicular data exchange system of the present invention formatted for responding to the requested buy/appraisal figure for the vehicle with vehicular characteristics data units listed thereon.

DETAILED DESCRIPTION OF THE PREFERRED EMBODIMENT

Figure 5:
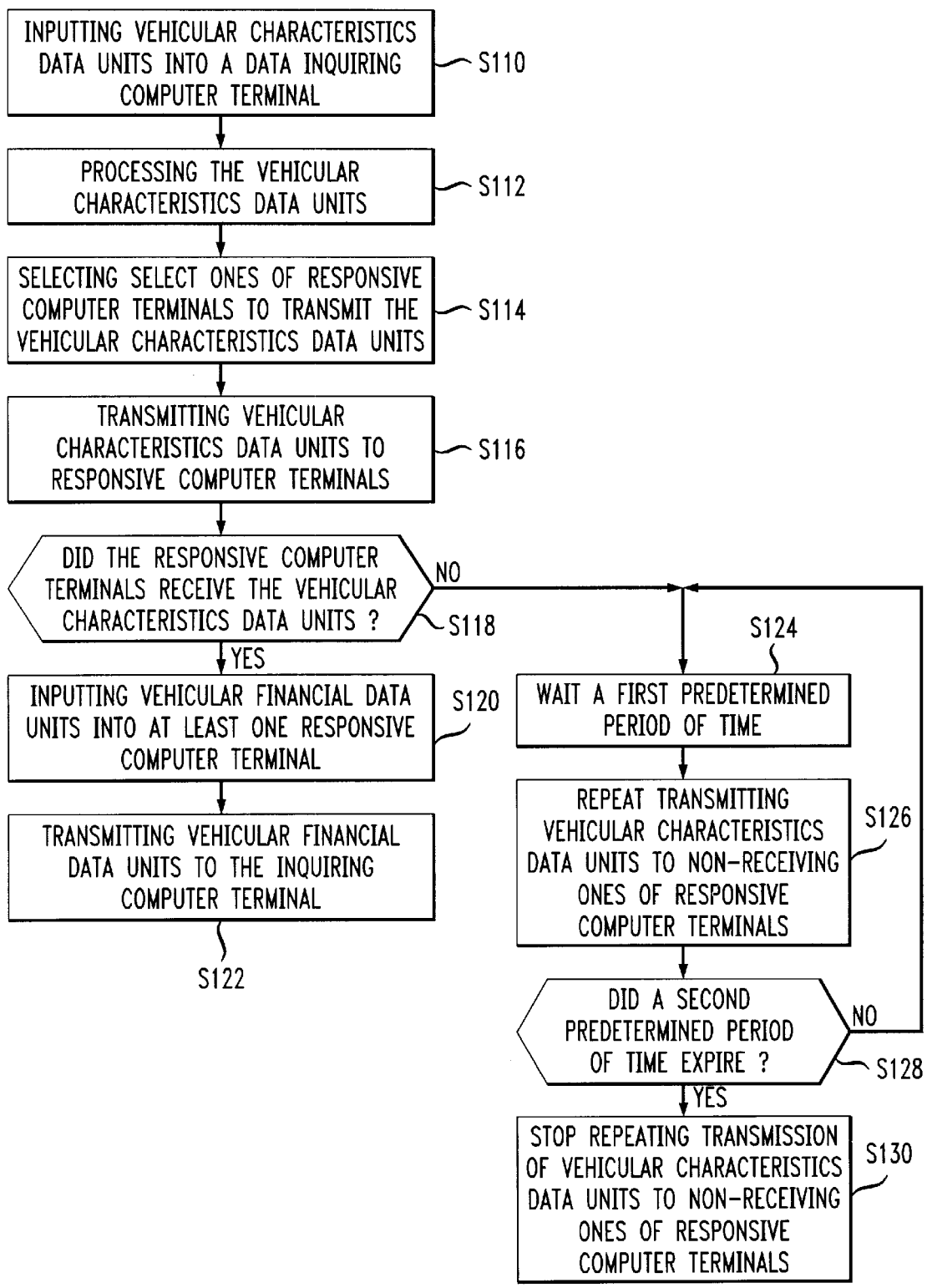
FIG. 5 is a flow chart illustrating how the vehicular data exchange system of the present invention operates.

A vehicular data exchange system 10 of the present invention is generally introduced in FIGS. 1–5 and includes computer hardware and software. The vehicular data exchange system 10 is adapted for use to exchange vehicular data, as more particularly described below, relating to a vehicle such as an automobile, a truck, a motorcycle, an earth moving vehicle, a boat, an airplane or the like. However, the vehicular exchange data system of the present invention shall be described, by way of example only, for exchanging vehicular data for vehicles typically sold at automobile dealerships. It would be understood by a skilled artisan that each automobile dealership would be electronically connected to the vehicular data exchange system by a computer terminal.

With reference to FIG. 1, the vehicular data exchange system 10 of the present invention includes a plurality of computer terminals 12a–12f and a processor 14. One of ordinary skill in the art would appreciate that the computer terminals 12a–12f represent an entire network of many computer terminals. Each of the computer terminals 12a–12f include an input device 16 shown, by way of example, as a computer keyboard for inputting the vehicular data into the vehicular data exchange system 10 and a display device 18, commonly known as a computer monitor, for visually displaying the vehicular data inputted into the plurality of computer terminals 12a–12f. Therefore, the computer terminals 12a–12f are associated with respective ones of input devices 16a–16f and display devices 18a–18f. Generally, the vehicular data include vehicular characteristics data units and vehicular financial data units as discussed below.

The processor 14 controls the vehicular data that is inputted into the computer terminals 12a–12f. An illustration of the operation of the vehicular data exchange system 10 of the present invention is best shown in FIG. 1 by viewing the arrows which represent the vehicular data. The vehicular characteristics data units are inputted into a first one of the computer terminals 12a by the input device 16a and are thereafter transmitted to the processor 14 as represented by arrow "A". From the processor 14, the vehicular characteristics data units represented by arrows "B" are then transmitted to a plurality of other ones of the computer terminals 12b–12d for display on respective ones of the display devices 18b–18d that are associated with the other ones of the computer terminals 12b–12d.

Thereafter, vehicular financial data units are inputted to at least one responding one of the other ones of the computer terminals 12b in response to the vehicular characteristics data units displayed on the display device 18b of the at least responding one of the other ones of the computer terminals 12b–12d. The vehicular financial data units represented by arrow "C" are transmitted through the processor 14 and to the first one of the computer terminals 12a for display on the display device 18a associated with the first one of the computer terminals 12a.

As noted, only certain other computer terminals 12b–12d received the vehicular characteristics data units while the computer terminals 12e–12f did not receive the vehicular characteristics data units. This is because a discriminator 20 is included in the vehicular data exchange system 10 of the present invention as shown in FIG. 2. The discriminator 20 operates to select only certain ones of the other ones of the plurality of computer terminals 12b–12f to which the vehicular characteristics data units are to be transmitted. Having the discriminator 20 incorporated into the vehicular data exchange system 10 of the present invention permits automobile dealerships to receive only vehicular characteristics data units for vehicles in which they have an interest. Thus, automobile dealerships that have no interest in purchasing certain vehicles or no expertise in providing assessment data for certain vehicles will not receive vehicular characteristics data units for such vehicles. Therefore, the automobile dealerships that use the vehicular data exchange system 10 of the present invention will not waste any time or resources reviewing the display device for undesirable vehicular characteristics data units but will invest some time only for those vehicles with interesting vehicular characteristics data units.

In FIG. 2, the processor 14 of the vehicular data exchange system 10 of the present invention also includes a repeater 22. The repeater 22 is operative in conjunction with the discriminator 20 to repeat transmission of the vehicular characteristics data units to the selected ones of the other computer terminals until the selected ones of the computer terminals receive the vehicular characteristics data units. It is possible that one or more of the computer terminals are busy either receiving or inputting data and, therefore, no vehicular characteristics data units are capable of being transmitted to the busy ones of the computer terminals. The repeater 22 then permits the vehicular characteristics data units to be transmitted at least one more time to the previously busy computer terminal.

Also shown in FIG. 2, the processor 14 includes a first timer 24 that is operative in conjunction with the repeater 22. The first timer 24 times a first predetermined time period. Upon expiration of the first predetermined time period, the repeater 22 causes the processor 14 to again attempt to transmit the vehicular characteristics data units to those computer terminals that were previously busy and did not receive the vehicular characteristics data units. It is possible that some of the previously busy computer terminals remain busy even after another attempt is made to send the vehicular data characteristics units thereto. The first timer 24 resets to time another first predetermined time period and, upon expiration of the first reset predetermined time period, another attempt is made to transmit the vehicular characteristics data units to those previously busy computer terminals. The first timer can be set in such a manner that the repeater can repeat the repeating process as often desired. It is preferred that the first predetermined time period is in a range between 3 and 5 minutes.

However, to limit the repeating process of the repeater 22, the processor 14 includes a second timer 26. The second timer 26 is operably connected to the processor 24 and times a second predetermined time period. The second predetermined time period is longer than the first predetermined time period. Upon expiration of the second predetermined time period, the repeater 22 is rendered inoperative and, therefore, regardless of the interest of one or more automobile dealerships in receiving vehicular characteristics data units, no further attempts at retransmitting these particular vehicular characteristics data units will be made. The second predetermined expiration time period can be any time desired by a skilled artisan. However, an optimum predetermined expiration time period can be in a range between 15 minutes to one hour after first attempting the transmission. This predetermined expiration time period is considered optimum because a prospective automobile customer with a trade-in vehicle would, most likely, remain on an automobile dealer's premises for this time period. It is beneficial to the automobile dealership seeking vehicular financial data units from other dealerships receive the same during the time period during which the prospective customer remains on the premises. Once the prospective customer leaves the premises, any vehicular financial data units has minimal value.

One of ordinary skill in the art would comprehend that most computer terminals include a speaker which broadcasts various sounds driven by appropriate software. The vehicular data exchange system 10 of the present invention includes an alarm device 26 which operates in conjunction with the speaker to generate sound. The alarm device is operative to alert an operator of the other ones of the plurality of computer terminals that vehicular characteristics data units are received and available for display on the display device. Further, the alarm could also be a video alarm that displays, for example, indicia on the display device 18.

FIG. 3 illustrates a sample display screen 28 entitled "Request for Buy/Appraisal Figure" and shown on the display device 18 of the vehicular data exchange system 10 of the present invention. The sample display screen 28 is formatted for requesting a buy/appraisal figure for a vehicle with vehicular characteristics data units mentioned thereon. The vehicular characteristics data units include a make, a model, a year and a general description of the vehicle. Although not by way of limitation, the description of the vehicle includes a body style of the vehicle, a color of both interior and exterior of the vehicle, an amount of mileage indicated on an odometer of the vehicle and a general condition of the vehicle with ratings of clean, average or rough. Other vehicular characteristics data units are vehicle identification number, i.e. VIN #, location of the vehicle, engine size and type, general condition of the vehicle, condition of the tires. Also, blank space appears on the sample data display screen 28 to write other types of vehicular characteristics data unit including but not limited to other equipment and remarks.

FIG. 4 is a second sample display screen entitled "Response to Request for Buy/Appraisal Figure" and shown on the display device of the vehicular data exchange system of the present invention formatted for responding to the requested buy/appraisal figure for the vehicle with vehicular characteristics data units listed thereon. The vehicular financial data units of the vehicle include a firm buy figure from the responding automobile dealership which is interested in purchasing the vehicle. Alternatively, the vehicular financial data units of the vehicle include an appraisal figure which indicates to the requesting automobile dealer a fair market value of the vehicle. A skilled artisan would appreciate that other financial data units such as a bid price amount, an assessment price amount, a wholesale price amount, and a retail price amount could also be provided on the second sample display screen. Also, the requesting automobile dealership knows which automobile dealership responded to the request. Now, the requesting automobile dealership can call the telephone number of the responding automobile dealership and speak to the contact who is also listed on the second sample display screen to arrange the consummation of the buy and sale of the trade-in vehicle. Thus, the vehicular financial data units of the vehicle further include information also identify a source of vehicular financial data units that were transmitted in response to the request.

With reference to FIG. 5, implementing the vehicular data exchange system 10 of the present invention is a software program that includes steps of a method of exchanging vehicular data of a vehicle. Step S110 of the method of the present invention is inputting vehicular characteristics data units of the vehicle into a data inquiring computer terminal. Step S112 is processing the vehicular characteristics data units and step 114 is selecting select ones of responsive computer terminals to transmit the vehicular characteristics data units. Step 118 determines if the responsive computer terminals receive the vehicular characteristics data units. If it is determined that the responsive computer terminals receive the vehicular characteristics data units, then step S120 is implemented. Step S120 is inputting vehicular financial data units into at least one responsive computer terminal. Step S122 is transmitting the vehicular financial data units to the inquiring computer terminal.

If it is determined that the responsive computer terminals did not receive the vehicular characteristics data units, then step S124, waiting for a first predetermined period of time, is implemented. After expiration of the first predetermined period of time, step S126 is repeating transmission of the vehicular characteristics data units to the non-receiving ones of the responsive computer terminals. Thereafter, it is determined by step S128 whether a second predetermined period of time has expired. If the second predetermined period of time has not expired, then steps S124 and S126 are repeated. If the second predetermined period of time has expired, step 130 is executed which stops repeating the transmission of vehicular characteristics data units to non-receiving ones of the responsive computer terminals.

The vehicular data exchange system enables automobile dealers to quickly and conveniently exchange vehicle characteristics data and vehicle sales price data of a trade-in vehicle within a time period during which a prospective customer of the selling dealer remains on the premises. cooperating automobile dealers could minimize or even eliminate the use of automobile wholesalers by using the vehicular data exchange system. The vehicular data exchange system would provide firm buy figures from other automotive dealers within minutes from the time the vehicular characteristics data are disseminated from a selling dealer. To eliminate computer clutter and wasting automobile dealership resources, the vehicular data exchange system transmits vehicular characteristics data units such as make, model and year of the vehicle to only those automobile dealers interested in receiving such data. Use of the vehicular data exchange system requires only a minimum of time and effort for all automobile dealers to buy and sell trade-in or inventory vehicles.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

We claim:

1. A vehicular data exchange system adapted for use to exchange vehicular data relating to a vehicle, comprising:

a plurality of computer terminals, each of said computer terminals including an input device for inputting the vehicular data that includes vehicular characteristics data units and vehicular financial data units and a display device for visually displaying the vehicular data inputted into said plurality of computer terminals;

a processor for controlling the vehicular data whereby the vehicular characteristics data units inputted into a first one of said computer terminals are transmitted to a plurality of other ones of said computer terminals for display on respective ones of said display devices associated with the other ones of said computer terminals and whereby vehicular financial data units inputted to at least a responding one of the other ones of said computer terminals in response to the vehicular characteristics data units displayed on said display device of said at least responding one of the other ones of said computer terminals are transmitted said first one of the computer terminals for display on the display device associated with the first one of the computer terminals; and an alarm device operative to alert an operator of the at least responding one of the other ones of the plurality of computer terminals that vehicular characteristics data units are available for display thereon.

2. A vehicular data exchange system according to claim 1, wherein the vehicular characteristics data units include a make, a model and a year of the vehicle.

3. A vehicular data exchange system according to claim 2, wherein the vehicular characteristics data units include a description of the vehicle.

4. A vehicular data exchange system according to claim 3, wherein the description of the vehicle includes at least one of a body type of the vehicle, a color of the vehicle, an amount of mileage displayed on an odometer of the vehicle and a general condition of the vehicle.

5. A vehicular data exchange system according to claim 1, wherein the vehicular financial data units of the vehicle include at least one of a bid price amount, an assessment price amount, a wholesale price amount, and a retail price amount.

6. A vehicular data exchange system according to claim 1, wherein the vehicular financial data units of the vehicle further include information identifying a source of vehicular financial data units transmitted.

7. A method of exchanging vehicular data of a vehicle, comprising the steps of:

inputting vehicular characteristics data units of the vehicle into a data inquiring computer terminal;

processing the vehicular characteristics data units by selecting select ones of a plurality of data responsive computer terminals to which the vehicular characteristics data units are to be transmitted and transmitting the vehicular characteristics data units to the plurality of data responsive computer terminals for display thereon;

inputting vehicular financial data units into at least one of the plurality of data responsive computer terminals in response to the vehicular characteristics data received by the responsive computer terminals;

transmitting the vehicular financial data units to said inquiring computer terminal for display on said inquiring computer terminal; and repeating transmission of said vehicular characteristics data units to said select ones of said plurality of responding computer terminals until said select ones of the data responding computer terminals receive the vehicular characteristics data units.

8. A method according to claim 7, wherein the vehicular characteristics data units include a make, a model and a year of the vehicle.

9. A method according to claim 7, wherein the vehicular characteristics data units include a description of the vehicle.

10. A method according to claim 7, wherein the vehicular financial data units of the vehicle include at least one of a bid price amount, an assessment price amount, a wholesale price amount, and a retail price amount.

11. A method according to claim 10, wherein the vehicular financial data units of the vehicle include identifying information identifying a source of each responsive computer terminal transmitting the vehicular financial data units.

12. A vehicular data exchange system according to claim 1, wherein the vehicular financial data units include an identity of a responding vehicle dealership.

13. A vehicular data exchange system according to claim 1, wherein each of said computer terminals is a personal computer.

14. A vehicular data exchange system adapted for use to exchange vehicular data relating to a vehicle, comprising:
   a plurality of computer terminals, each of said computer terminals including an input device for inputting the vehicular data that includes vehicular characteristics data units and vehicular financial data units and a display device for visually displaying the vehicular data inputted into said plurality of computer terminals;
   a processor for controlling the vehicular data whereby the vehicular characteristics data units inputted into a first one of said computer terminals are transmitted to a plurality of other ones of said computer terminals for display on respective ones of said display devices associated with the other ones of said computer terminals and whereby vehicular financial data units inputted to at least a responding one of the other ones of said computer terminals in response to the vehicular characteristics data units displayed on said display device of said at least responding one of the other ones of said computer terminals are transmitted said first one of the computer terminals for display on the display device associated with the first one of the computer terminals;
   a discriminator for selecting select ones of said other ones of said plurality of computer terminals to which the vehicular characteristics data units are transmitted; and
   a repeater operative in conjunction with said discriminator to repeat transmission of said vehicular characteristics data units to said select ones of said other ones of said plurality of computer terminals until said select ones of the computer terminals receive said vehicular characteristics data units.

15. A vehicular data exchange system according to claim 14 further comprising a first timer operative in conjunction with said repeater whereby, upon expiration of a predetermined expiration time period, said repeater is rendered inoperative.

16. A method for exchanging vehicular data of a vehicle, comprising the steps of:
   inputting vehicular characteristics data units of the vehicle into a data inquiring computer terminal;
   processing the vehicular characteristics data units by transmitting the vehicular characteristics data units to a plurality of data responsive computer terminals for display thereon;
   inputting vehicular financial data units into at least one of the plurality of data responsive computer terminals in response to the vehicular characteristics data received by the responsive computer terminals;
   transmitting the vehicular financial data units to said inquiring computer terminal for display on said inquiring computer terminal; and
   repeating transmission of said vehicular characteristics data units to said select ones of said plurality of responding computer terminals until expiration of a first predetermined period of time occurs.

17. A method according to claim 16, further comprising the step of stopping the repeating step upon expiration of a second predetermined period of time which is longer than the first predetermined period of time.

* * * * *